(12) United States Patent
Wang et al.

(10) Patent No.: US 11,580,975 B2
(45) Date of Patent: Feb. 14, 2023

(54) SYSTEMS AND METHODS FOR RESPONSE SELECTION IN MULTI-PARTY CONVERSATIONS WITH DYNAMIC TOPIC TRACKING

(71) Applicant: salesforce.com, inc., San Francisco, CA (US)

(72) Inventors: Weishi Wang, Singapore (SG); Shafiq Rayhan Joty, Singapore (SG); Chu Hong Hoi, Singapore (SG)

(73) Assignee: salesforce.com, inc., San Francisco, CA (US)

( * ) Notice: Subject to any disclaimer, the term of this patent is extended or adjusted under 35 U.S.C. 154(b) by 84 days.

(21) Appl. No.: 17/014,458

(22) Filed: Sep. 8, 2020

(65) Prior Publication Data

US 2021/0375280 A1   Dec. 2, 2021

Related U.S. Application Data

(60) Provisional application No. 63/032,874, filed on Jun. 1, 2020.

(51) Int. Cl.
| | | |
|---|---|---|
| *G10L 15/22* | (2006.01) | |
| *G10L 15/16* | (2006.01) | |
| *G10L 15/18* | (2013.01) | |
| *G10L 15/06* | (2013.01) | |
| *G10L 15/02* | (2006.01) | |
| *G06K 9/62* | (2022.01) | |

(52) U.S. Cl.
CPC ............ *G10L 15/22* (2013.01); *G06K 9/6264* (2013.01); *G10L 15/02* (2013.01); *G10L 15/063* (2013.01); *G10L 15/16* (2013.01); *G10L 15/1822* (2013.01); *G10L 2015/221* (2013.01)

(58) Field of Classification Search
CPC ... G10L 15/063; G10L 15/16; G10L 15/1822; G10L 15/22; G10L 15/26; G06F 40/00; G06F 40/30; G06F 40/35
See application file for complete search history.

(56) References Cited

PUBLICATIONS

Qu, Chen, et al. "Attentive history selection for conversational question answering." Proceedings of the 28th ACM International Conference on Information and Knowledge Management. 2019. (Year: 2019).*

Whang, Taesun, et al. "An effective domain adaptive post-training method for bert in response selection." arXiv preprint arXiv: 1908.04812 (2019). (Year: 2019).*

(Continued)

*Primary Examiner* — Paras D Shah
(74) *Attorney, Agent, or Firm* — Haynes and Boone LLP

(57) ABSTRACT

Embodiments described herein provide a dynamic topic tracking mechanism that tracks how the conversation topics change from one utterance to another and use the tracking information to rank candidate responses. A pre-trained language model may be used for response selection in the multi-party conversations, which consists of two steps: (1) a topic-based pre-training to embed topic information into the language model with self-supervised learning, and (2) a multi-task learning on the pretrained model by jointly training response selection and dynamic topic prediction and disentanglement tasks.

20 Claims, 12 Drawing Sheets

(56) References Cited

PUBLICATIONS

Gu, Jia-Chen, et al. "Pre-trained and attention-based neural networks for building noetic task-oriented dialogue systems." arXiv preprint arXiv:2004.01940 (2020). (Year: 2020).*
Devlin, Jacob, et al. "Bert: Pre-training of deep bidirectional transformers for language understanding." arXiv preprint arXiv: 1810.04805 (2018). (Year: 2018).*
Lu, Junyu, et al. "Spatio-Temporal Matching Network for Multi-Turn Responses Selection in Retrieval-Based Chatbots.", 2018. (Year: 2018).*
Wu, Yu, et al. "Sequential matching network: A new architecture for multi-turn response selection in retrieval-based chatbots." arXiv preprint arXiv:1612.01627 (2016). (Year: 2016).*
Zhao, Xueliang, et al. "A document-grounded matching network for response selection in retrieval-based chatbots." arXiv preprint arXiv: 1906.04362 (2019). (Year: 2019).*
Yang, Liu, et al. "IART: Intent-aware response ranking with transformers in information-seeking conversation systems." Proceedings of the Web Conference 2020. 2020. (Year: 2020).*
Boussaha, B. E. A. (2019). Response selection for end-to-end retrieval-based dialogue systems (Doctoral dissertation, Nantes).*
Tao, C., Wu, W., Xu, C., Hu, W., Zhao, D., & Yan, R. (Jan. 2019,). Multi-representation fusion network for multi-turn response selection in retrieval-based chatbots. In Proceedings of the twelfth ACM international conference on web search and data mining (pp. 267-275).*
Lowe et al., "The Ubuntu dialogue corpus: A large dataset for research in unstructured multi-turn dialogue systems," in Proceedings of the 16th Annual Meeting of the Special Interest Group on Discourse and Dialogue, pp. 285-294, Prague, Czech Re-ublic. Association for Computational Linguistics, 2015.
Kim et al., "The eighth dialog system technology challenge," arXiv preprint arXiv:1911.06394, 2019, 13 pages.
Devlin, et al., "BERT: pre-training of deep bidirectional transformers for language understanding," arXiv preprint arXiv:1810.048051, 2018, 14 pages.
Vaswani et al., "Attention is all you need," arXiv preprint arXiv:1706.03762v1, 2017, 15 pages.
Wu et al., "Enhancing response selection with advanced context modeling and post-training," DSTC8 Workshop at Association of the Advanced Artificial Intelligence, 2020, 8 pages.
Chen et al., "Enhanced LSTM for natural language inference," in Proceedings of the 55th Annual Meeting of the Association for Computational Linguistics, vol. 1: Long Papers, 2017, 11 pages.
Gunasekara et al., "DSTC7 task 1: Noetic end-to-end response selection," in Proceedings of the First Workshop on NLP for Conversational Artificial Intelligence, Florence, Italy, Association for Computational Linguistics, 2019, 7 pages.
Zhu et al., "Who did they respond to? conversation structure modeling using masked hierarchical transformer," arXiv preprint arXiv:1911.10666, 2019.
Yan et al., "Learning to Respond with Deep Neural Networks for Retrieval-Based Human-Computer Conversation System," Proceedings of the 39th International ACM SIGIR Conference on Research and Development in Information Retrieval, pp. 55-64, 2016.
Whang et al., "Domain adaptive training BERT for response selection," arXiv preprint arXiv:1908.04812, 2019, 8 pages.
Wu et al., "A Sequential Matching Framework for Multi-Turn Response Selection in Retrieval-Based Chatbots," Computational Linguistics, vol. 45, No. 1, pp. 163-197, 2019.
Chaudhuri et al., Improving response selection in multi-turn dialogue systems by incorporating domain knowledge, arXiv preprint arXiv:1809.03194, 2018, 11 pages.
Zhou et al., "Multi-view Response Selection for Human-Computer Conversation," Proceedings of the 2016 Conference on Empirical Methods in Natural Language Processing, 2016, 10 pages.
Zhang et al., "Modeling multi-turn conversation with deep utterance aggregation," arXiv preprint arXiv:1806.09102, 2018, 13 pages.
Zhou et al., "Multi-Turn Response Selection for Chatbots with Deep Attention Matching Network," Proceedings of the 56th Annual Meeting of the Association for Computational Linguistics (vol. 1: Long Papers), pp. 1118-1127, 2018.
Gu et al., "Interactive matching network for multi-turn response selection in retrieval-based chatbots," Proceedings of the 28th ACM International Conference on Informationand Knowledge Management, 2019, 5 pages.

\* cited by examiner

| Speaker | Dialogue History |
|---|---|
| _timello | sorry, but I lost my link, repeating the question: anybody knows why I can't play any .mpg, etc? it shows me the sound, but not shows me the screen |
| Nafallo | _timello: probably missing codecs |
| Nafallo | hmm, anyone else got troubles with docbook-dsssl version 1.78-4? |
| danhunt | Check http://www.desktopos.com/reviews.php?op=PrintReview&id=21 for .mpg tips. |
| Nafallo | it works now :-P, takes a bit more to downgrade through aptitude than upgrade :-) |
| _timello | danhunt, I installed mplayer and the essential codecs package, but it still isn't working. I didn't find why |
| Nafallo | Well can I move the drives |
| danhunt | Nafallo: you can't move the drives, definitely not. This is the problem with RAID : ) |
| Nafallo | danhunt: haha, yeah |
| Nafallo | _timello: run mplayer from a terminal and check the output? |

| Tasks@Track2 | Train set | Val set | Test set |
|---|---|---|---|
| Task 1 (# Dialog) | 225,367 | 4,827 | 5,529 |
| Task 2 (# Dialog) | 112,262 | 9,565 | 9,027 |
| Task 4 (# Chat log) | 153 | 10 | 10 |

Table 1: DSTC-8 Ubuntu Dataset Statistics.

FIG. 10

| Model | Recall@1 | Recall@5 | Recall@10 | MRR |
|---|---|---|---|---|
| BERT$_{base}$ | 0.287 | 0.503 | 0.572 | 0.351 |
| BERT$_{-domain}$ | 0.532 | 0.797 | 0.840 | 0.677 |
| Adapt-BERT | 0.706 | 0.916 | 0.957 | 0.799 |
| Topic-BERT | 0.726 | 0.930 | 0.970 | 0.807 |
| −TP | 0.720 | 0.927 | 0.964 | 0.803 |
| −D | 0.710 | 0.924 | 0.960 | 0.800 |
| −TP−D | 0.696 | 0.910 | 0.950 | 0.790 |

Table 2: Response selection results on DSTC-8 Ubuntu.

FIG. 11

| Model | BLEU4 | Precision@N-gram | | | |
|---|---|---|---|---|---|
| | | N=1 | N=2 | N=3 | N=4 |
| Topic-BERT | 0.75 | 7.876 | 2.032 | 0.250 | 0.078 |

Table 3: BLEU4 and N-gram precision are calculated using SacreBLEU on incorrectly selected responses.

FIG. 12

| Model | Precision | Recall | F-Score |
|---|---|---|---|
| BERT | 0.523 | 0.482 | 0.502 |
| Topic-BERT | 0.890 | 0.847 | 0.868 |
| −D | 0.891 | 0.845 | 0.867 |
| −RS | 0.889 | 0.840 | 0.864 |
| −D −RS | 0.866 | 0.793 | 0.828 |
| w/o FT | 0.848 | 0.781 | 0.813 |

Table 4: Topic prediction results on DSTC-8 Ubuntu.

FIG. 13

| Model | Precision | Recall | F-Score |
|---|---|---|---|
| BERT | 0.431 | 0.417 | 0.424 |
| MH BERT | 0.539 | 0.517 | 0.528 |
| Feed-Forward | 0.748 | 0.718 | 0.733 |
| Topic-BERT | 0.754 | 0.725 | 0.739 |
| −TP | 0.749 | 0.727 | 0.737 |
| −RS | 0.705 | 0.692 | 0.698 |
| −TP −RS | 0.689 | 0.678 | 0.683 |

Table 5: Disentanglement results on DSTC-8 Ubuntu.

FIG. 14

| Model | Recall10@1 | Recall10@2 | Recall10@5 |
|---|---|---|---|
| DL2R | 0.626 | 0.783 | 0.944 |
| Multi View | 0.662 | 0.801 | 0.951 |
| SMN$_{dynamic}$ | 0.726 | 0.847 | 0.961 |
| AK-DE-biGRU | 0.747 | 0.868 | 0.972 |
| DUA | 0.752 | 0.868 | 0.962 |
| DAM | 0.767 | 0.874 | 0.969 |
| IMN | 0.777 | 0.888 | 0.974 |
| ESIM | 0.796 | 0.894 | 0.975 |
| MRFN$_{FLS}$ | 0.786 | 0.886 | 0.976 |
| BERT$_{base}$ | 0.817 | 0.904 | 0.977 |
| BERT-DPT | 0.851 | 0.924 | 0.984 |
| Topic-BERT | 0.861 | 0.933 | 0.985 |

Table 6: Response selection results on Ubuntu Corpus

FIG. 15

SYSTEMS AND METHODS FOR RESPONSE SELECTION IN MULTI-PARTY CONVERSATIONS WITH DYNAMIC TOPIC TRACKING

CROSS-REFERENCES

The present disclosure is a nonprovisional application of and claims priority under 35 U.S.C. 119 to U.S. provisional application No. 63/032,874, filed on Jun. 1, 2020, which is hereby expressly incorporated by reference herein in its entirety.

TECHNICAL FIELD

The present disclosure relates generally to machine learning models and neural networks, and more specifically, to response selection in multi-party conversations with dynamic topic tracking.

BACKGROUND

Neural networks have been used to generate conversational responses and thus conduct a dialogue with a human user. For example, a human user can engage in a conversation with an intelligent assistant to gather information on a specific topic, to perform a task such as booking travel tickets, making restaurant reservations, and/or the like. For example, some existing task-oriented dialogue systems use a retrieval-based response generation engine that selects a suitable response from a pool of candidates (pre-existing human responses) to frame a dialogue. Compared to other generation-based systems that generates novel utterances, retrieval-based systems may produce more fluent, grammatical and informative responses. In addition, the retrieval-based response generation engine does not usually rely on dedicated modules for language understanding, dialog management, and generation, unlike other traditional modular approach, which can simplify the system design. However, when participants simultaneously engage in a multi-party multi-turn conversation with multiple conversational topics, existing retrieval-based response selection systems are often limited to two-party conversations only.

Therefore, there is a need for a dialogue system that conducts a dialogue in a multi-party conversation.

BRIEF DESCRIPTION OF THE DRAWINGS

FIG. 1 shows a block diagram illustrating an example multi-party dialogue involving multiple participants, according to embodiments described herein.

FIG. 10 shows an example data table illustrating dataset statistics for multi-party conversations, according to one embodiment.

FIG. 11 shows an example data table illustrating the performance comparison between the topic-BERT model with various base models using the dataset shown in FIG. 10, according to one embodiment.

FIG. 12 shows an example data table illustrating the BLEU4 and N-gram precision value of the topic-BERT, according to one embodiment described herein.

FIG. 13 shows an example data table illustrating the topic prediction results on the dataset shown in FIG. 10, according to one embodiment described herein.

FIG. 14 shows an example data table illustrating topic entanglement results on the dataset shown in FIG. 10, according to one embodiment described herein.

FIG. 15 shows an example data table illustrating the response selection results on a dataset different from the dataset shown in FIG. 10, according to one embodiment described herein.

Figure 2:
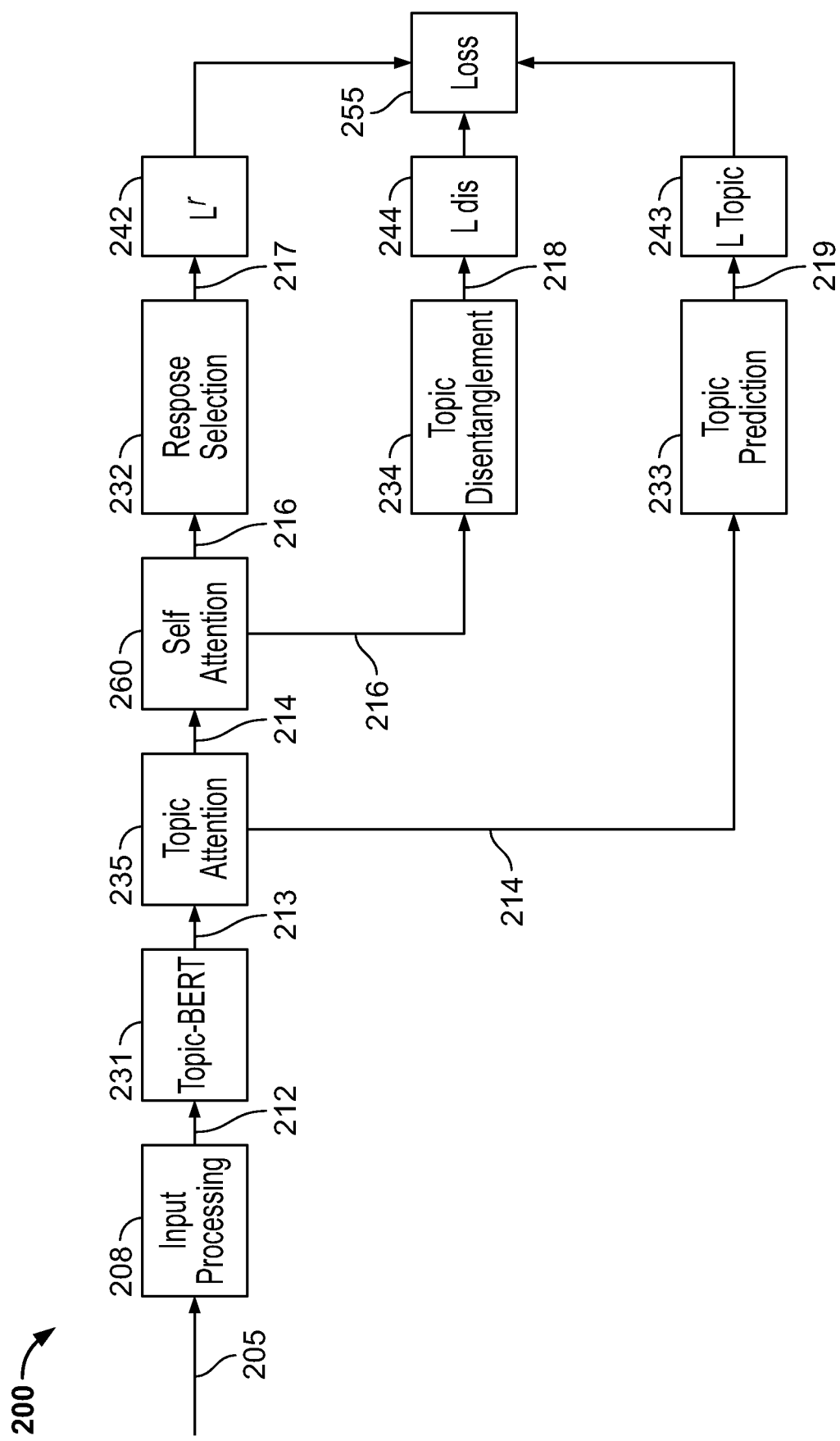
FIG. 2 provides a block diagram illustrating aspects of a multi-task language model based framework of a multi-party dialogue system for conducting a multi-party multi-turn dialogue, according to one embodiment described herein.

In the figures and appendix, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

A multi-party dialogue may involve multiple ongoing conversations between multiple participants. FIG. 1 shows a block diagram illustrating an example multi-party dialogue involving multiple participants, according to embodiments described herein. The conversation excerpt in FIG. 1 involves three participants, and three ongoing conversation topics labeled as 101*a-d*, 102*a-b* and 103. The participants contribute to multiple topics simultaneously (e.g., Nafallo participates in three and danhunt participates in two). Thus, an effective response selection method should model such complex conversational topic dynamics in the context, for which existing methods are deficient. Specifically, a proper response should match with its context in terms of the same conversation topic, while avoiding other non-relevant topics.

In view of the need for response generation in a multi-party multi-turn dialogue, embodiments described herein provide a dynamic topic tracking mechanism that tracks how the conversation topics change from one utterance to another and use the tracking information to rank candidate responses. A pre-trained language model may be used for response selection in the multi-party conversations, which consists of two steps: (1) a topic-based pre-training to embed topic information into the language model with self-supervised learning, and (2) a multi-task learning on the pre-trained model by jointly training response selection and dynamic topic prediction and disentanglement tasks.

Specifically, a language model pre-trained with conversation data involving multi-parties and multiple topics is used to encode each utterance from a context history with a candidate response to generate a number of topic vectors corresponding to the different utterances. The topic vectors are then passed through a self-attention layer to learn topic relevance at the utterance level. A response can be selected according to ranking scores computed using a max-pooling layer that selects the most important information from the topic vectors.

In one embodiment, a dynamic topic tracking framework of response selection is devised with a multi-task learning framework for dynamic topic tracking, which supports efficient encoding with only two utterances at once. The auxiliary topic prediction task and topic disentanglement (tracing) task may be incorporated into the multi-task learning framework, which can be trained in an end-to-end manner for all of the three tasks. Based on the similarity of these three tasks, the objective is to match the topic (topic prediction) between context utterance, the response and the track response's topic (topic disentanglement) across contexts to select an appropriate response.

FIG. 2 provides a block diagram illustrating aspects of a multi-task language model-based framework of a multi-party dialogue system 200 for conducting a multi-party multi-turn dialogue, according to one embodiment described herein. The multi-party dialogue system 200 includes a language model, such as a Bidirectional Encoder Representations from Transformers (BERT), serving as the backbone of the multi-party dialogue system 200 for processing multi-party dialogues involving multiple topics, denoted as topic-BERT 231. The outputs of the topic-BERT module 231 may be used to perform downstream tasks by the response selection module 232, topic disentanglement module 234 and topic prediction module 233.

Specifically, the multi-party dialogue system 200 is configured to track how the conversation topics change from one utterance to another and use the tracking information for ranking the candidate responses. An input 205 of a context history $c_i=\{u_1, u_2, \ldots, u_n\}$ including n utterances and a candidate response $r_{i,j}$ may be input to the input processing module 208. The input processing module 208 may prepare the input utterance response pair into an input sequence of tokens 212, e.g., by flattening the utterance-response pair and inserting a start-of-sequence token [CLS] and/or separation tokens [SEP]. The input sequence of tokens 212 may be fed to the topic-BERT model 231. The topic-BERT model 231 may then encode the input sequence of tokens 212 into token representations 213. Specifically, the contextual token representations from the token representations 213 corresponding to the utterance tokens in the input sequence encodes topic relevance between the tokens representing the utterance $u_n$ from the input 205 and the tokens representing the candidate response $r_{i,j}$ from the input 205. A token representation representing a start token [CLS] captures utterance-level topic relevance. As the topic-BERT model 231 encodes two utterances (e.g., the input utterance-response pair $(u_k, r_{i,j})$, $1 \leq k \leq n$) at a time, the encoding process at topic-BERT model 231 is efficient and can be used to encode larger context.

The token representations 213 encoded by the topic-BERT model 231 are then passed to a topic attention layer 235, where the [CLS] representation may be used as query to attend over the token representations to further enforce topic relevance in the attended topic vectors 214. Further details of the input processing module 208, the topic-BERT model 231 and the topic attention layer 235 may be further described in relation to FIG. 5.

In some embodiments, a self-supervised approach is used to generate topic sentence pairs from existing dialogue datasets to embed topic information into a BERT model while pretraining the Topic-BERT model 231. For example, BERT-like models may be pre-trained on topic related sentence pairs to incorporate topic relevance in pretraining, which can be done on large dialog corpora with self-supervised objectives, requiring no manual topic annotations. The pre-trained BERT-like models can then be used for a number of downstream tasks such as response selection and/or other dialog tasks with improved performance. Further details of pre-training the topic-BERT model 231 may be further described in relation to FIG. 4.

After the topic attention module 235, the topic vectors 214 are then passed to the topic prediction module 233. Or, the topic vectors are passed to a self-attention layer 260 to generate self-attended topic vectors 216 before being passed to the response selection module 232 and the topic disentanglement module 234. In one embodiment, the modules 232-234 may be used to perform downstream tasks topic prediction, disentanglement, and response selection in parallel. In one embodiment, response selection may be the primary task, while the other two tasks may be auxiliary and optional.

The response selection module 232 is configured to measure the relevance of the input candidate response $r_{i,j}$ from the input 205 with respect to each utterance $u_k$ in the context $c_i$. For example, $\mathcal{D}_{rs}=\{(c_i, r_{i,j}, y_{i,j})\}_{i=1}^{|\mathcal{D}_{rs}|}$ denotes a response selection dataset, where j is the index of a response candidate for a context $c_i=\{u_2, u_n \ldots, u_n\}$ with n utterances. Each utterance $u_i=\{w_i, w_{i,1}, w_{i,2}, \ldots, w_{i,m}\}$ starts with m its speaker $s_i$ and is composed of words. Similarly, a response $r_{i,j}$ has a speaker $s_{i,j}$ and composed of n words. $y_{i,j} \in \{0, 1\}$ represents the relevance label. The response selection module is configured to output the relevance score 217 $f_{\theta_r}(c_i, r_{i,j})$ indicating that the candidate response $r_{i,j}$ is a relevant response to the context $c_i$ with model parameters $\theta_r$. The relevance score 217 is then used by the response selection loss module 242 to compute a response selection loss $\mathcal{L}_r$. Further details relating to the response selection module 232 can be found in relation to FIG. 6A.

In one embodiment, the topic prediction module 233 is configured to model a multi-party conversation with a single conversation topic. For example, $\mathcal{D}_{tp}=\{(c_i, r_i^+, r_i^-)\}_{i=1}^{|\mathcal{D}_{tp}|}$ denotes a topic prediction dataset, where $r_i^+$ denotes a positive (same) conversation response and $r_i^-$ denotes a negative (different conversation) response for context $c_i$. Each utterance pair from the same context constitutes $(c_i, r_i^+)$, and an utterance pair from different contexts constitutes $(c_i, r_i^-)$. The topic prediction module 233 is configured to generate a binary classifier 219 $g_{\theta_i}(c_i, r_i) \in \{0, 1\}$ indicating whether the response ($r_i$) belongs to the same topic with the context $c_i$ with model parameter $\theta_t$. The binary classifier 219 is then used by the topic loss module 243 to compute a topic loss $\mathcal{L}_{topic}$. Further details relating to the topic prediction module 233 can be found in relation to FIG. 6B.

In one embodiment, the topic disentanglement module 234 is configured to disentangle single conversations from a multi-party conversation based on topics. For example, for a given conversation context $c_i = \{u_1, u_2, \ldots, u_n\}$, a set of pairwise "reply-to" utterances $\mathcal{R} = \{(u_c, u_p)_1, \ldots, (u_c, u_p)_{|\mathcal{R}|}\}$ is given, where $u_p$ is a parent utterance of child utterance $u_c$. The topic disentanglement module 234 is configured to compute a reply-to score 218 $h_{\theta d}(u_i, u_j)$ for $j \leq I$, which indicates the score for utterance $u_j$ being the parent of utterance $u_i$, with model parameters $\theta_d$. The reply-to score 218 is then used by the disentanglement loss module 244 to compute a disentanglement loss $\mathcal{L}_{dis}$. The individual conversations can then be constructed by following the reply-to links. Note that an utterance $u_i$ may point to itself, referred to as self-link. Self-links are either the start of a conversation or a system message, and they play a crucial role in identifying the conversation clusters. Further details relating to the topic disentangle module 234 can be found in relation to FIG. 6B.

In one embodiment, the response selection loss $\mathcal{L}_r$, the topic loss $\mathcal{L}_{topic}$, and the disentanglement loss $\mathcal{L}_{dis}$ may each be used to update the corresponding parameters of the modules 232-234, respectively. In another embodiment, the losses may be then sent to the loss module 255, where a weighted sum of the response selection loss $\mathcal{L}_r$, the topic loss $\mathcal{L}_{topic}$, and the disentanglement loss $\mathcal{L}_{dis}$ may be computed to train the modules 232-234 jointly, e.g., the parameters $\theta_R$, $\theta_t$, $\theta_d$ may be jointly updated based on the combined loss from the loss module 255, via backpropagation.

Computer Environment

Figure 3:
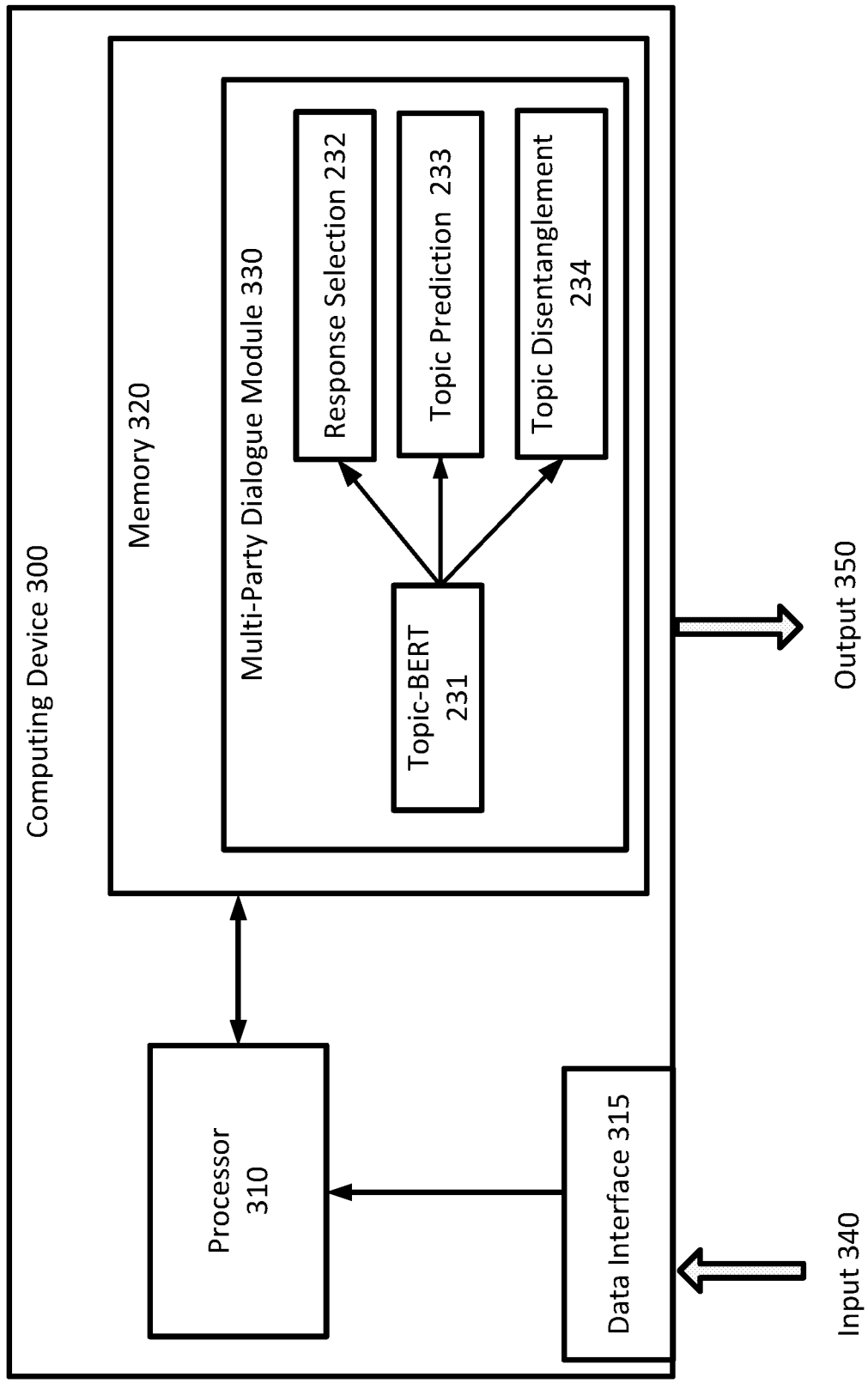
FIG. 3 is a simplified diagram of a computing device for implementing a multi-party dialogue system shown in FIG. 2, according to some embodiments.

FIG. 3 is a simplified diagram of a computing device for implementing a multi-party dialogue system shown in FIG. 2, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a multi-party dialogue module 330 that may be used to implement and/or emulate the systems and models, and/or to implement any of the methods described further herein. In some examples, the multi-party dialogue module 330, may receive an input 340, e.g., such as a conversation history including at least a user utterance, a system response, and/or the like, via a data interface 315. The data interface 315 may be any of a user interface that receives the user utterance, or a communication interface that may receive or retrieve a context history from the database. The multi-party dialogue module 330 may generate an output 350 such as a selected response for the context of the input conversation history.

In some embodiments, the multi-party dialogue module 330 includes the topic-BERT model 231, the response selection module 232, the topic prediction module 233 and the topic disentanglement submodule 234. Specifically, as described in relation to FIG. 2, the topic-BERT model 231 may be a language model pre-trained with topic utterance pairs. The response selection module 232 is configured to determine a relevance ranking score for each context history and response candidate pair to classify the binary relationship between the context and response. The topic prediction module 233 is configured to generate a relevance score to classify the binary topic relationship between an utterance pair for multi-party dialogues with a single conversation topic. The topic disentanglement module 234 is configured to determine a relevance score to classify the link relationship between parent utterance and child utterance, where the parent utterance is the one that the child utterance replies to. With modules 231-234, the multi-party dialogue module 330 is configured to model the dynamic of conversation topic to select response conditioned on the conversation topic.

The multi-party dialogue module 330 and the modules 231-234 may be implemented using hardware, software, and/or a combination of hardware and software.

Multi-Party Dialogue System

Figure 4:
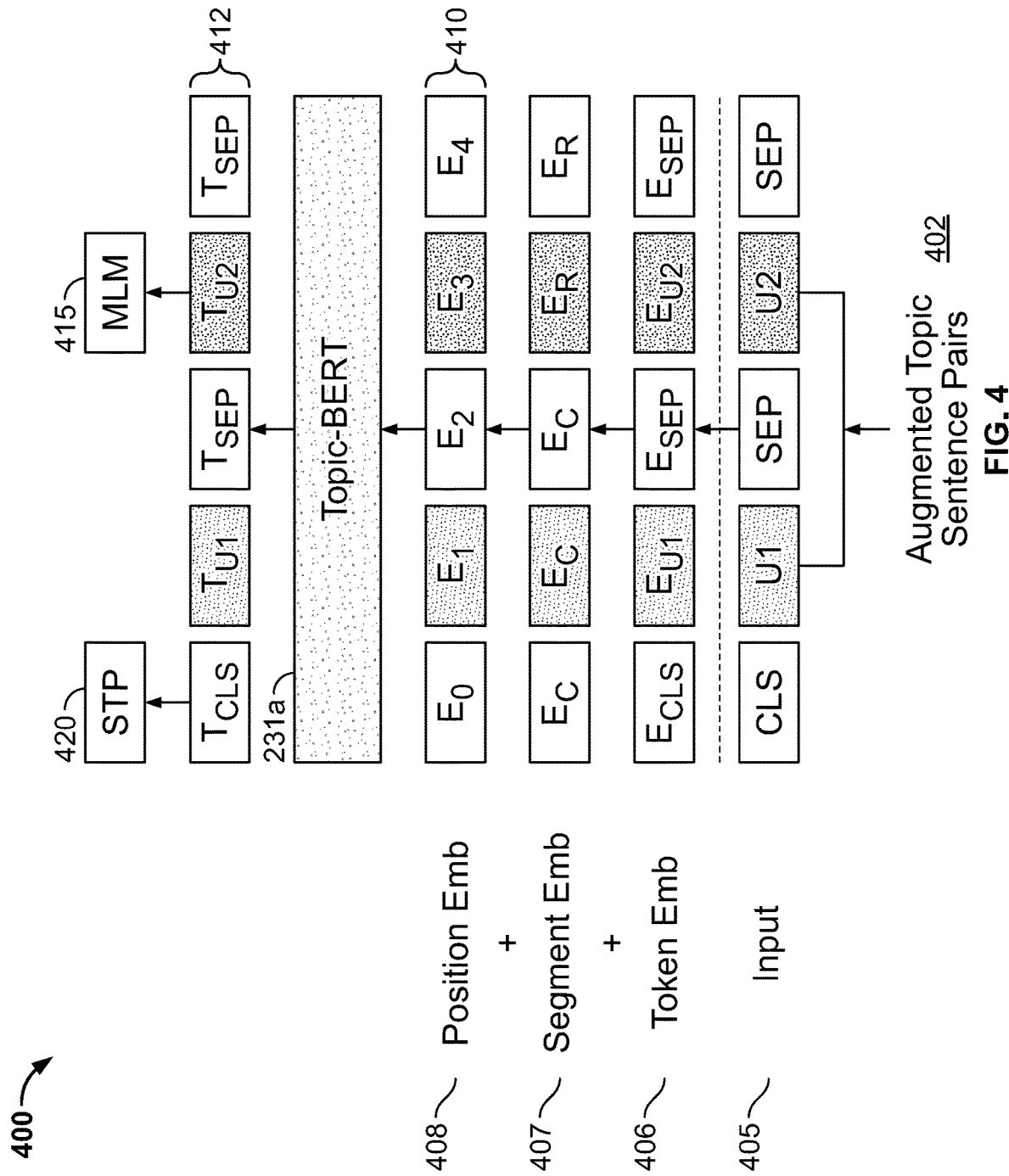
FIG. 4 is a block diagram illustrating an example architecture of the multi-party dialogue system pre-training the topic-BERT model in FIG. 2, according to one embodiment described herein.

FIG. 4 is a block diagram 400 illustrating an example architecture of the multi-party dialogue system pre-training the topic-BERT model 231a in FIG. 2, according to one embodiment described herein. Diagram 400 shows the pre-training stage of topic-BERT model 231 (here denoted as topic-BERT model 231a, to differentiate from the topic-BERT model 231b post pre-training shown in FIG. 5).

The multi-party dialogue system is configured to pretrain a language model, such as BERT directly on a relevant task (e.g., response selection, etc.) in a self-supervised way, without requiring any human annotation for training data. In other words, the topic-BERT model is pre-trained such that it can be used to encode relevant topic information for topic related downstream tasks. To achieve this goal, a single-threaded conversation between two or more participants covering a single topic and the utterance pairs in the single-threaded conversation can be used to pretrain the topic- BERT model 231a with self-supervised objectives. For example, the training single-threaded dialogue data may be obtained from Ubuntu Dialogue Corpus from multi-threaded chatlogs using unsupervised heuristics described in Lowe et al., The Ubuntu dialogue corpus: A large dataset for research in unstructured multi-turn dialogue systems, in Proceedings of the 16th Annual Meeting of the Special Interest Group on Discourse and Dialogue, pages 285-294, Prague, Czech Re-public. Association for Computational Linguistics, 2015, which is hereby expressly incorporated herein by reference in its entirety. For another example, the training single-threaded dialogue data may be obtained from the DSTC-8 task 1 described in Kim et al., 2019), The eighth dialog system technology challenge, arXiv preprint arXiv: 1911.06394, which is hereby expressly incorporated herein by reference in its entirety. The single-threaded conversation may be automatically collected from Ubuntu chat logs. This dataset contains detached speaker-visible conversations between two or more participants from the Ubuntu IRC channel.

To pretrain the topic-BERT model 231a, a pretrained uncased BERT base model may be retrieved and initialized. The uncased BERT base model may be similar to the BERT model described in Devlin et al., BERT: pre-training of deep bidirectional transformers for language under-standing, CoRR, abs/1810.04805, 2018, which is hereby expressly incorporated by reference herein in its entirety.

Training dataset may be obtained in the form of augmented topic sentence pairs 402. Specifically, the pre-training dataset is denoted as $\mathcal{D}_{pr} = \{(u_i, r_i^+, r_i^-)\}_{i=1}^{\mathcal{D}_{pr}}$, where each utterance pair from the same conversation (including the true response) constitutes a positive pair $(u_i, r_i^+)$ as the utterance and response having the matched topic. For each such positive pair $(u_i, r_i^+)$, one or more negative responses $r_i^-$ are randomly selected from a candidate pool of responses (e.g., 100 responses that are randomly selected from the conversation) to balance the positive and negative ratio. The topic-BERT model 231a is then pre-trained on the set of $\mathcal{D}_{pr}$ with self-supervised objectives such as the masked language modeling (MLM) loss and/or the same topic prediction (STP) loss.

For example, in one implementation, a portion of the input tokens may be masked randomly according to a probability (e.g., 15%, 20%, 25%, etc.), and replaced with a different token. For example, the masked token may be replaced with a mask token, e.g., [MASK] token at 80% of the time, with a random word at 10% of the time, and with the original word at 10% of the time. The masked input sequence is then fed to the topic-BERT model 231a, which may in turn generate an output for computing an MLM loss 315. Details of computing an MLM loss may be found in Devlin et al., 2018.

For another example, each training pair $(u_i, r_i^+)$ or $(u_i, r_i^-)$ 402 may be flattened to generate an input sequence 305, e.g., ([CLS], [U$_1$], [SEP], [U$_2$], [SEP]) where U$_1$ and U$_2$ may denote the flattened utterance $u_i$ and response $r_i^+$ or $r_i^-$. Similar to the Next Sentence Prediction (NSP) task of the BERT base model, the input sequence 405 are passed through a combination of token embedding 406, segment embedding 407 and position embedding 408 to result in an input layer token representation 410. The token representations 410 are then passed through multiple transformer encoder layers in the topic-BERT model 231a. The transformer layers may be similar to those described in Vaswani et al., Attention is all you need. CoRR, abs/1706.03762, which is hereby expressly incorporated by reference herein in its entirety. Each transformer layer is comprised of a self-attention and a feed-forward sublayer. The multiple transformer layer at the topic-BERT model 231a may generate an encoder output 412, denoted by (T$_{CLS}$, T$_{U1}$, T$_{SEP}$, T$_{U2}$, T$_{SEP}$), where T$_{CLS}$ denotes the encoded portion of the [CLS] token in the input sequence 305. Specifically, different from the original BERT base model, the topic-BERT model 231 uses the [CLS] representation to predict whether the training pair 402 is a positive (same topic) pair or a negative (different topic) pair. Thus, the [CLS] representation T$_{CLS}$ encodes topic relationship between the two utterances U$_1$ and U$_2$, and will be used as the topic-aware contextual embedding to determine whether the two utterances are matched in topic. The [CLS] representation T$_{CLS}$ may then be used to compute a STP loss 420, e.g., by comparing with the input training pair 402 (positive or negative).

The STP loss 420 and/or the MLM loss 415 may then be used to update the topic-BERT model 231a.

Figure 5:
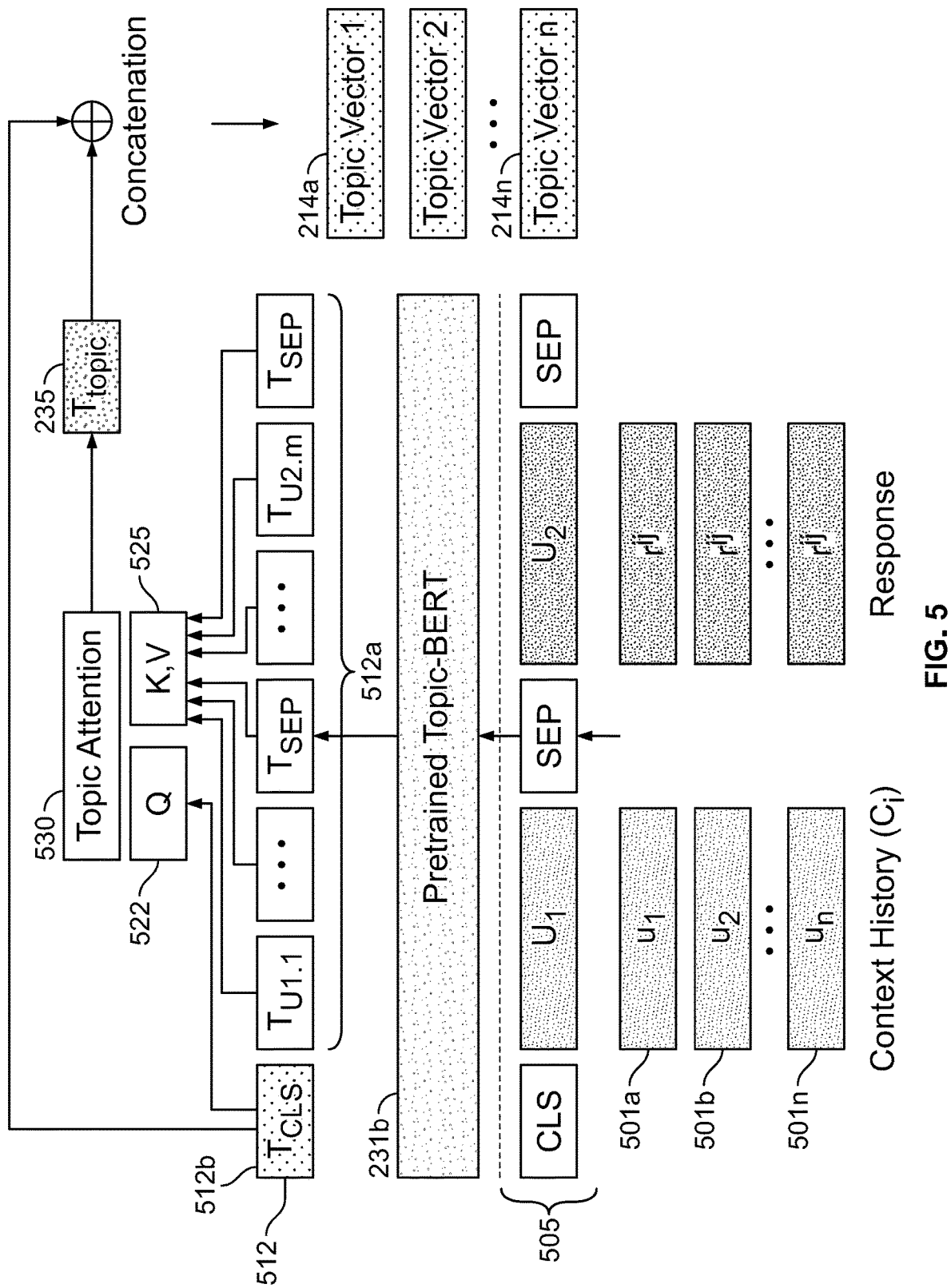
FIG. 5 is a block diagram illustrating an example architecture of the multi-party dialogue system using the topic-BERT model pretrained in FIG. 4 to generate topic vectors for performing downstream tasks, according to one embodiment described herein.

FIG. 5 is a block diagram illustrating an example architecture of the multi-party dialogue system using the topic-BERT model pretrained in FIG. 4 to generate topic vectors for performing downstream tasks, according to one embodiment described herein. FIG. 5 shows a pretrained topic-BERT model 231b configured to receive an input sequence 505 generated from various utterance pairs 501a-n. For example, the utterance $u_k$ from the conversation context $c_i = \{u_1, u_2, \ldots, u_n\}$ along with a candidate response $r_{i,j}$ form a number of utterance pairs 501a-n. The utterance pairs 501a-n are then each flattened to generate input sequence 405 in the form of ([CLS], [U$_1$], [SEP], [U$_2$], [SEP]).

The input sequence 505 is then input to the pre-trained topic-BERT model 231b. As described in relation to FIG. 3, the transformer encoder inside the pre-trained topic-BERT model 231b is pre-trained to generate an encoded representation 512. Specifically, the pre-trained topic-BERT model 231b is pre-trained to encode topic relevance between U$_1$ and U$_2$ (which in turn represents the topic relevance between the tokens of $u_k$ and the tokens of $r_{i,j}$) into the contextual token representations 512a, denoted by T$_{U1,1}$, T$_{U2,1}$ $\cdots$ , T$_{U2,m}$. The topic-BERT model 231b is also pre-trained to encode utterance-level relevance into the [CLS] representation 512b.

An attention layer 530 is applied to the encoded representation 512 to enhance topic information. The start-of-sequence token [CLS] representation 512b, denoted by T$_{CLS}$, may then be used as query 522 to attend over the token representations $\{T_j\}_{j=1}^{K}$ as keys and values 525, where K denotes the total number of tokens 512a in the encoded representation 512 excluding T$_{CLS}$ 512b. The attention layer 530 may be then applied using the query 522, keys and values 525 served from tokens in the encoded representation 512:

$$e_j = v_a^T \tanh(W_a T_{CLS} + U_a T_j);$$

$$T_{topic} = \sum_{j=1}^{K} a_j T_j;$$

$$a_j = \frac{\exp(e_j)}{\sum_{j=1}^{K} \exp(e_j)};$$

where $v_\alpha$, $W_\alpha$ and $U_\alpha$ are trainable parameters. The generated vector T$_{topic}$ 535 is then concatenated with T$_{CLS}$ 512b to form a topic vector $t=[T_{CLS}; T_{topic}]$, e.g., one of 214*a-n*. Specifically, the encoding process may be repeated for the n utterances in the context $c_i=\{u_1, u_2, \ldots, u_n\}$ by pairing each utterance $u_k$ with the candidate response $r_{i,j}$ to get n different topic vectors 214*a-n* $T_j=\{t_1, \ldots, t_n\}$. $T_j$ represents $r_{i,j}$'s topic relevance to the context utterances $c_i=\{u_1, u_2, \ldots, u_n\}$. Thus, the topic vectors 214*a-n* $T_j=\{t_1, \ldots, t_n\}$ may then be fed to the task-specific layers to perform downstream tasks, such as response selection module 232, topic prediction module 233 and topic disentanglement 234.

Figure 6A:
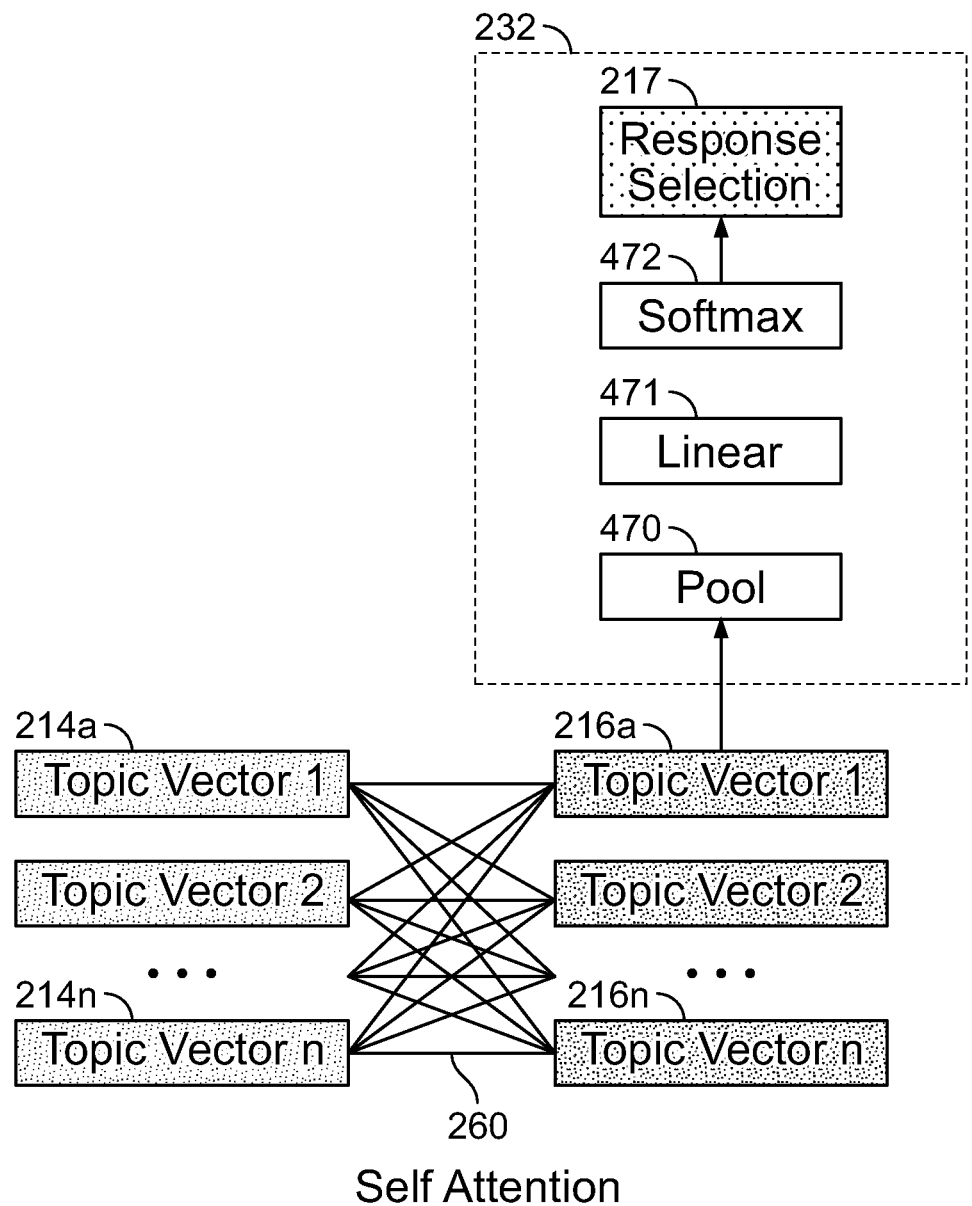
FIG. 6A provides a block diagram illustrating using the topic vectors generated from FIG. 5 for response selection, according to one embodiment described herein.

FIG. 6A provides a block diagram illustrating using the topic vectors 214*a-n* generated from FIG. 5 for response selection, according to one embodiment described herein. In one embodiment, the topic vectors 214*a-n* may be passed to the response selection module 232 in a multi-party multi-turn conversation. In response selection, the relevance of a candidate response $r_{i,j}$ is measured with respect to the context $c_i$. For this, a hard context retrieval method similar to that in Wu et al, Enhancing response selection with advanced context modeling and post-training, DSTC8 Workshop at Association of the Advanced Artificial Intelligence, 2020, may be applied to filter out irrelevant utterances and to reduce the context size. Then, after the filtering, each context utterance may be paired with the response $r_{i,j}$ as the input to topic-BERT model 231*b* to compute the corresponding topic vectors $T_j$ through the topic attention layer 530.

The topic vectors 214*a-n* $T_j \in \mathbb{R}^{n \times d}$ are passed through a scaled dot-product self-attention layer 260 to learn all-pair topic relevance at the utterance level. Details of the self-attention layer may be found in Vaswani et al., 2017. Specifically, the self-attention layer 260 generates self-attended topic vectors 216*a-n* $T_j'$:

$$T_j' = \text{softmax}\left(\frac{(T_j W_q)(T_j W_k)^T}{\sqrt{d}}\right)(T_j W_v)$$

where $\{W_q, W_k, W_v\} \in \mathbb{R}^{n \times d}$ are the query, key and value parameters, respectively, and d denotes the hidden dimension of 768.

The self-attended topic vectors 216*a-n* are then sent to a max-pooling layer 470 to select the most important information, followed by a linear layer 471 and a softmax layer 472 to compute the relevance score of the response $r_{i,j}$ with the context $c_i$. For example, the relevance score 217 $f_{\theta_r}(u_k, r_{i,j})$ indicating that the candidate response $r_{i,j}$ is a relevant response to the utterance $u_k$ is computed as:

$$f_{\theta_r}(u_k, r_{i,j}) = \text{softmax}(W_r(\text{maxpool}(T_j')))$$

where $W_r$ is the task-specific parameter of the linear layer 471. The relevance score $f_{\theta_r}(u_k, r_{i,j})$ 217 may then be used to generate a response selection indication. For example, the response selection indication may select the candidate response $r_{i,j}$ having the highest relevance score as the response to the utterance $u_k$.

In one implementation, a cross entropy loss may be computed for response selection submodule 232:

$$\mathcal{L}_{rs} = -\sum_{i,j} \mathbb{1}(y_{i,j})\log(f_{\theta_r})$$

where $\mathbb{1}(y_{i,j})$ is the one-hot encoding of the ground truth label.

Figure 6B:
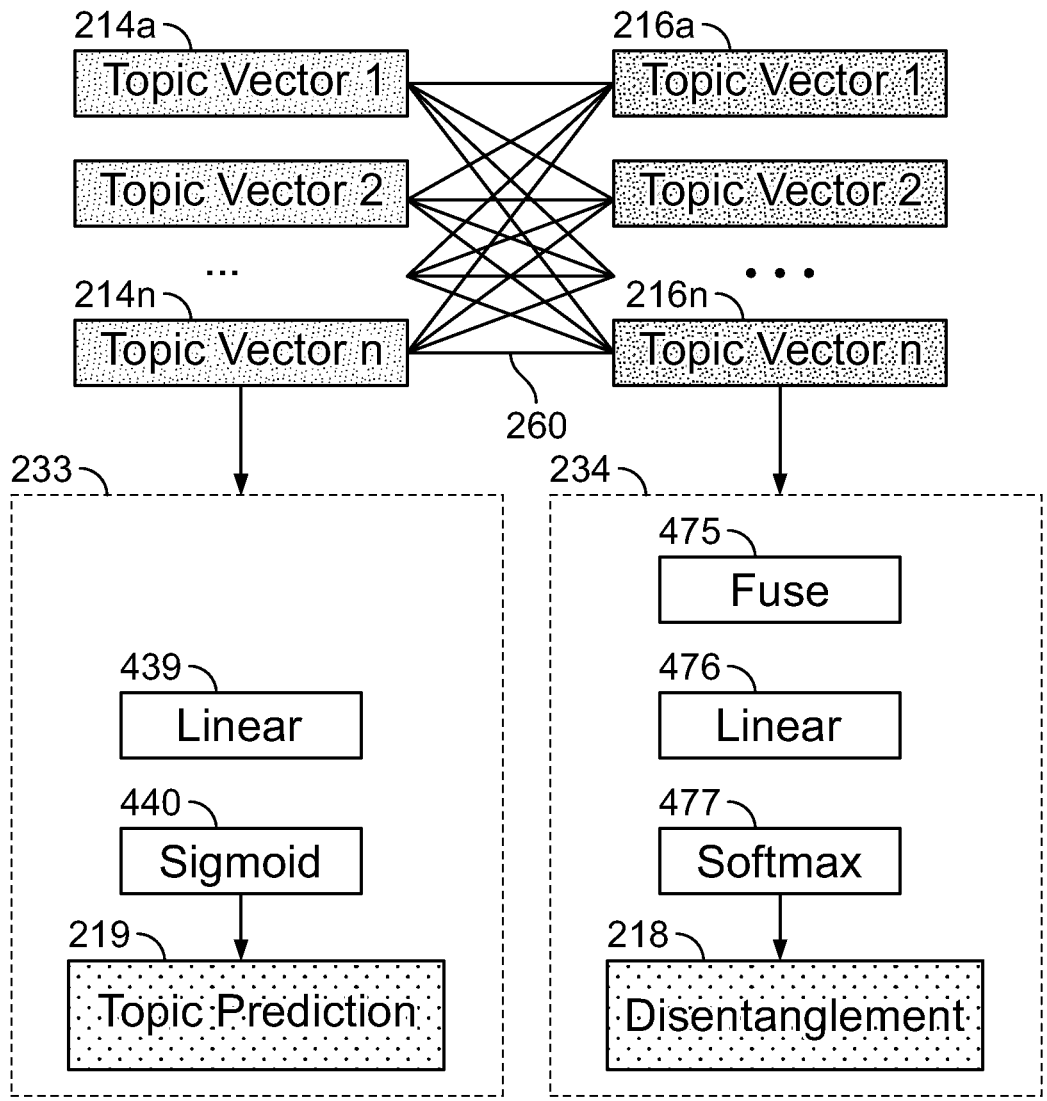
FIG. 6B provides a block diagram illustrating using the topic vectors generated from FIG. 5 for topic prediction and topic disentanglement, according to one embodiment described herein.

FIG. 6B provides a block diagram illustrating using the topic vectors 214*a-n* generated from FIG. 5 for topic prediction and topic disentanglement, according to one embodiment described herein. In one embodiment, the topic vectors 214*a-n* are passed to a linear layer 260 and a sigmoid layer 440 for topic prediction. Specifically, topic prediction may be done for each utterance-response pair $(u_k, r_{i,j})$ for all $u_k \in c_i$ to decide whether $u_k$ and $r_{i,j}$ should be in the same topic. As discussed above, the topic-BERT model 231*b* has encoded input representation 405 corresponding to the utterance-response pair $(u_k, r_{i,j})$ pair into topic vectors $t_k \in T_j$. A binary topic classification model may be built by the linear layer 439 and the sigmoid layer 440 to output an indication of topic prediction 219:

$$g_{\theta_t}(u_k, r_{i,j}) = \text{sigmoid}(\omega_p^T t_k)$$

where $\omega_p^T$ is the task-specific parameter in the linear layer 439. The resulting classifier 219 $g_{\theta_t}(u_k, r_{i,j})$ is a binary value indicating whether the utterance-response pair $(u_k, r_{i,j})$ belongs to the same topic.

In one implementation, a binary cross entropy loss may be computed for the topic prediction submodule 233:

$$\mathcal{L}_{topic} = -y \log g_{\theta_t} - (1-y)\log(1-g_{\theta_t})$$

where $y \in \{0, 1\}$ is the ground truth indicating same or different topic.

In one embodiment, the self-attended topic vectors 216*a-n*, after applying the self-attention layer 260 to the topic vectors 214*a-n* may be passed to the topic disentanglement module 234. Specifically, the topic disentanglement module 234 is configured to find the "reply-to" links between the utterances (including the candidate response) to track which utterance is replying to which previous utterance.

For training on the topic disentanglement module 234, a sliding window is simulated over the entire (entangled) conversation. Each window constitutes a context $c_i=\{u_1, u_2, \ldots u_n\}$ and the module 234 is trained to find the parent of $u_n$ in $c_i$, in other words, to find the reply-to link $(u_n, u_{n_p})$ for $1 \leq n_p \leq n$. Specifically, for the input to the topic-BERT model 231*b*, each utterance $u_n$ is treated as the response, and the response-response pair $(u_n, u_n)$ is input to the topic-BERT model 231*b*, thus allowing also response-response $(u_n, u_n)$ interactions through the encoding layers of the topic-BERT model 231*b* to facilitate self-link predictions, e.g., the fact that $u_n$ can point to itself.

In the task-specific layer for the disentanglement module 234, the self-attended topic vectors 468*a-n*$T_j'=\{t_1', \ldots, t_n'\} \in \mathbb{R}^{n \times d}$ is split into two parts: context topic vectors encapsulated in $T_c'=\{t_1', \ldots, t_{n-1}'\} \in \mathbb{R}^{(n-1) \times d}$ and the response topic vector $t_n' \in \mathbb{R}^d$. In order to model high-order interactions between the response and context utterances, the differences and element-wise products between the response and context utterances. The response vector $t_n'$ is then duplicated to obtain $T_r'=\{t_n', \ldots, t_n'\} \in \mathbb{R}^{(n-1) \times d}$ and concatenated with $T_c'$ and $T_r'$ at the fusion layer 475:

$$T''=[T_R'; T_c'; T_r' \odot T_c'; T_r'-T_c']$$

The generated T'' is then passed to the linear layer 476 and the softmax layer 477 to compute the reply-to distribution 218 as:

$$h_{\theta_d}(u_n, c_i) = \text{softmax}(T'' w_d) \in \mathbb{R}^{n \times 1}$$

where $w_d$ is the task-specific parameter for the linear layer, and $h_{\theta_d}(u_n, c_i)$ indicates a probability distribution that utterance pair $(u_n, u_{n_p})$ for $1 \leq n_p \leq n$ follows the same topic.

During inference, $\text{argmax}_p h_{\theta_d}(u_n, c_i)$ may be computed as indication of topic disentanglement 452. For another example, the disentanglement output 452 may select the utterance pair $(u_n, u_{n_p})$ for $1 \le n_p \le n$ has the highest probability to establish a reply-to link, e.g., utterance $u_n$ follows the same topic as utterance $u_{n_p}$.

The topic disentanglement submodule 452 may be trained with a cross-entropy loss:

$$\mathcal{L}_{dis} = -\sum_{j=1}^{n} \mathbb{1}(y_j)\log(h_{\theta d}).$$

Thus, in one embodiment, the response selection module 232, the topic prediction module 233 and the topic disentanglement module 234, which share the same topic attention weights from topic attention layer 530 to benefit each other, may be jointly trained. Response selection may benefit from dynamic topic prediction and disentanglement. Similarly, topic prediction and disentanglement may benefit from the response prediction. The loss module 255 may compute the overall loss as a combination of the three task losses:

$$\mathcal{L} = \alpha \mathcal{L}_{rs} + \beta \mathcal{L}_{topic} + \gamma \mathcal{L}_{dis}.$$

where $\alpha$, $\beta$, and $\gamma$ are parameters which are chosen from [0, 0.1, 0.2, . . . , 1]. In some implementations, the parameters $\alpha$, $\beta$, and $\gamma$ may be chosen by optimizing model response selection accuracy on the training dataset.

Figure 7:
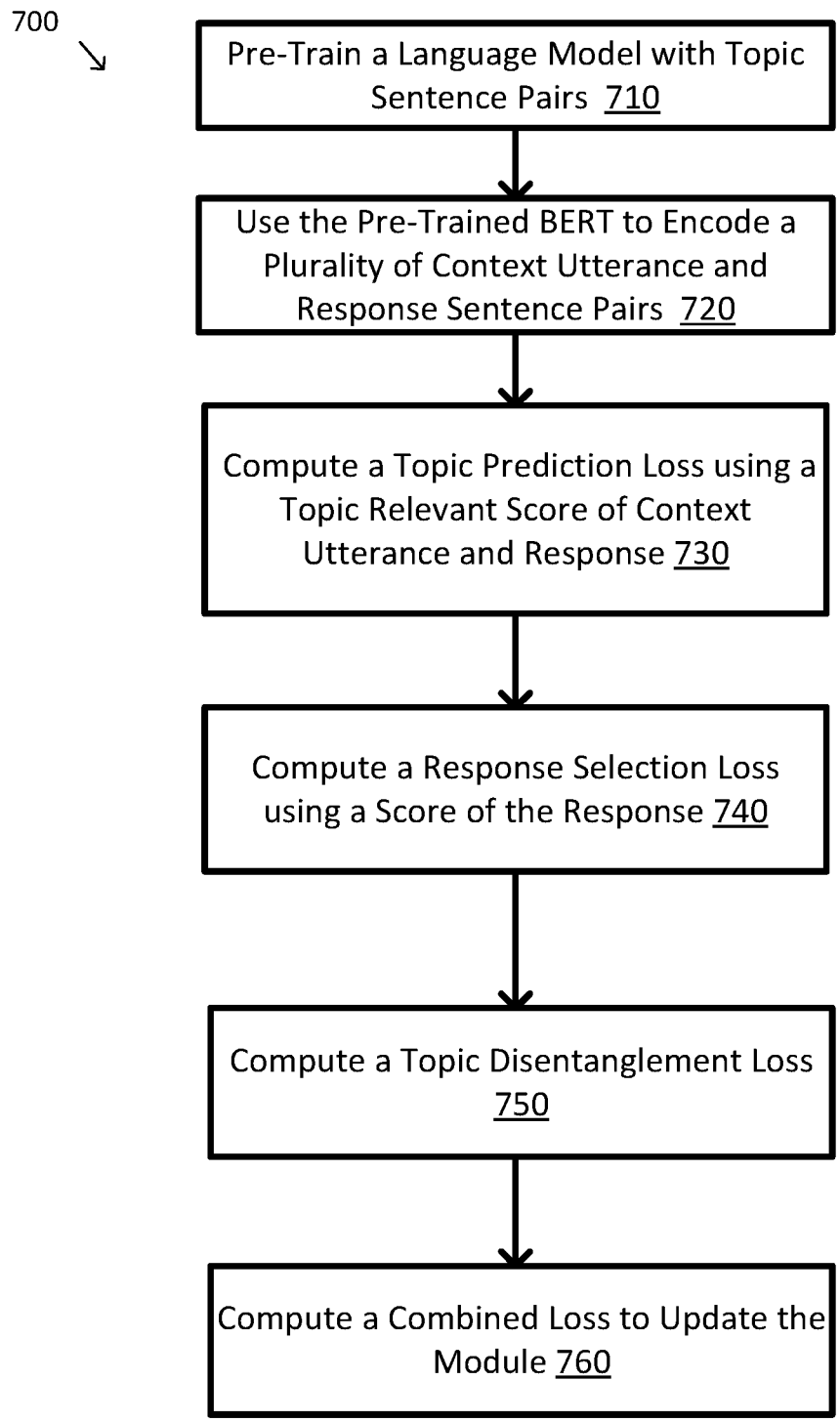
FIG. 7 is a simplified logic flow diagram illustrating a method for jointly training of modules in FIG. 2, according to some embodiments.

FIG. 7 is a simplified logic flow diagram illustrating a method for jointly training of modules 232-234 in FIG. 2, according to some embodiments. One or more of the processes 710-760 of method 700 may be implemented, at least in part, in the form of executable code stored on non-transitory, tangible, machine-readable media that when run by one or more processors may cause the one or more processors to perform one or more of the processes 710-760. In some embodiments, method 700 may correspond to the method used by the module 330 in FIG. 3.

At process 710, a language model, such as an uncased BERT model, may be pre-trained with augmented topic sentence pairs. For example, further details of self-supervised BERT pre-training may be described in relation to FIGS. 4 and 8.

At process 720, the pre-trained BERT model may be used to encode a plurality of context utterance and response sentence pairs. At process 730, a topic relevance score of context utterance and response may be computed based on the encoded context and response, and a topic prediction loss can be computed using the cross-entropy loss based on the topic relevance scores.

At process 740, a response selection loss may be computed using a score of the response. For example, a max-pooling layer may be added to select the most important information and a linear layer with softmax may compute the score of the response with the give n context utterances.

At process 750, a topic disentanglement loss can be computed. For example, to model the high-order interactions between the target message and its context messages, the differences and element-wise products between the target message and its context messages are computed. A topic disentanglement score is computed to represent the confidence link between each given context utterance and response pair, and the topic disentanglement loss can be computed as the cross-entropy loss of the topic disentanglement score. Further details of computing the response selection loss, or the topic prediction loss, or the topic disentanglement loss can be found in relation to FIGS. 5, 6A-6B and 9.

At process 760, a combined loss, e.g., a weighted sum of the topic prediction loss, response selection loss and topic disentanglement loss, can be computed to update the multi-party dialogue module 330. For example, the response selection module 232, the topic prediction module 233 and the topic disentanglement module 234 may be jointly trained based on the combined loss.

Figure 8:
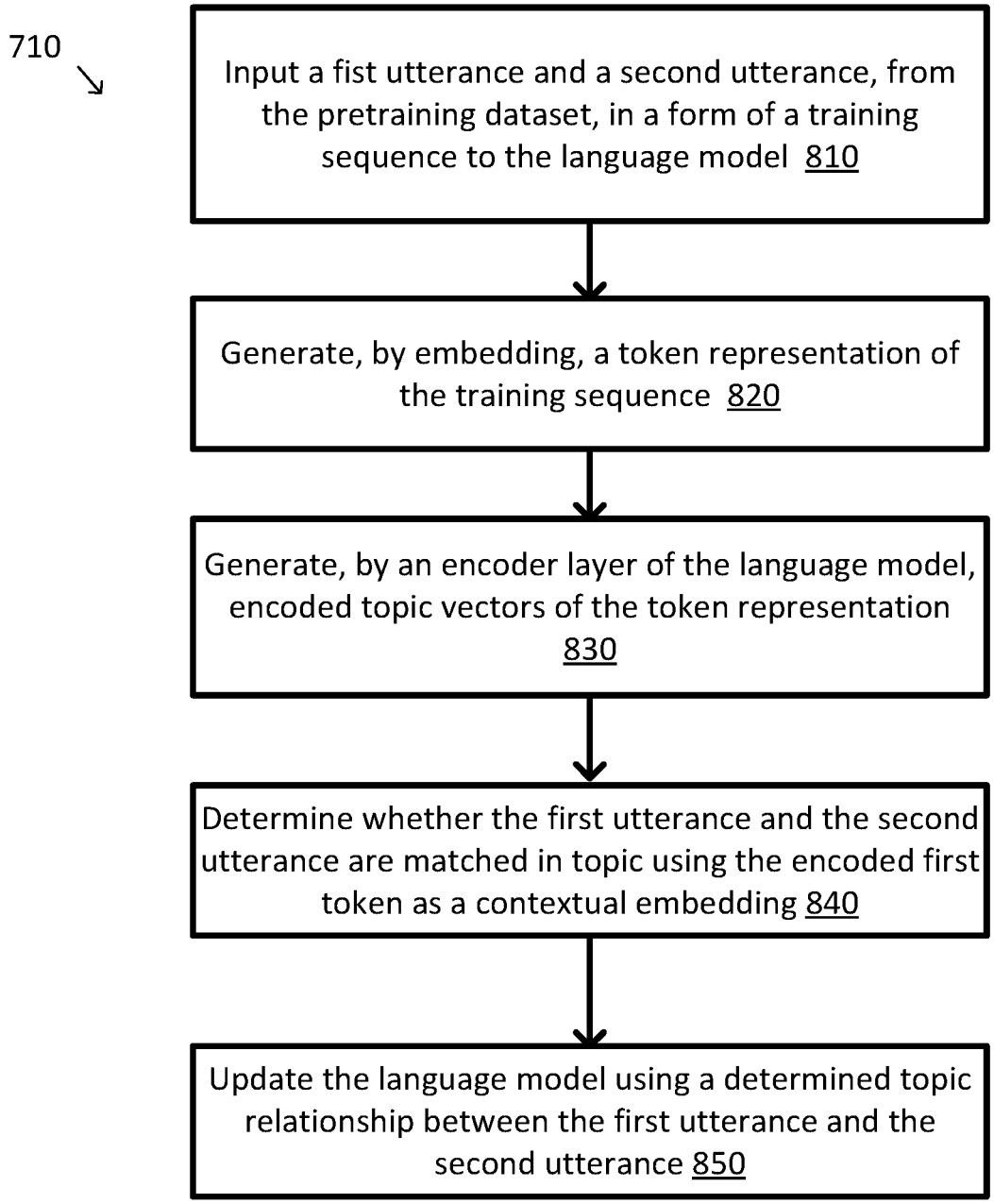
FIG. 8 is a simplified logic flow diagram illustrating a method for pretraining the BERT model in FIG. 7, according to some embodiments.

FIG. 8 is a simplified logic flow diagram illustrating a method for pretraining the BERT model at process 710 in FIG. 7, according to some embodiments. One or more of the processes 810-860 of method 700 may be implemented, at least in part, in the form of executable code stored on non-transitory, tangible, machine-readable media that when run by one or more processors may cause the one or more processors to perform one or more of the processes 810-860. In some embodiments, method 800 may correspond to the method used by the module 330 in FIG. 3.

At process 810, a first utterance and a second utterance, from the pretraining dataset, are input in a form of a training sequence to the language model. For example, as shown in IFG. 4, utterance and response are input in the form of augmented topic sentence pairs 402, which is flattened as an input sequence 405. The training sequence includes a first token, e.g., the [CLS] token, that predicts whether the first utterance $U_1$ and the second utterance $U_2$ belong to the same topic.

At process 820, a token representation of the training sequence is generated by embeddings. For example, the input token representation 410 is generated through the token embedding 406, segment embedding 407 and the position embedding 408.

At process 830, an encoder layer of the language model (e.g., the transformed layer in the topic-BERT model 231a) may generate encoded topic vectors of the token representation. For example, the encoded representation 412, which takes a form of the encoded topic vectors, includes a first encoded topic vector $T_{CLS}$ corresponding to the first token [CLS]. The first encoded topic vector $T_{CLS}$ encodes a topic relationship between the first utterance $U_1$ and the second utterance $U_2$.

At process 840, the multi-party dialogue module may then determine whether the first utterance $U_1$ and the second utterance $U_2$ are matched in topic using the encoded first token $T_{CLS}$ as a contextual embedding.

At process 850, the language model (e.g., topic-BERT 231a) may be updated using a determined topic relationship between the first utterance $U_1$ and the second utterance $U_2$. For example, a STP loss 420 may be computed using a cross-entropy loss based on a predicted probability distribution indicating the likelihood that the first utterance $U_1$ and the second utterance $U_2$ are matched in topic.

In some embodiments, at least a portion of the pretraining dataset comprising the plurality of utterances, paired positive responses and paired negative responses may be masked. The resulting masked training dataset may be used to train the language model (e.g., topic-BERT 231a) based on a masked language modeling loss.

Figure 9:
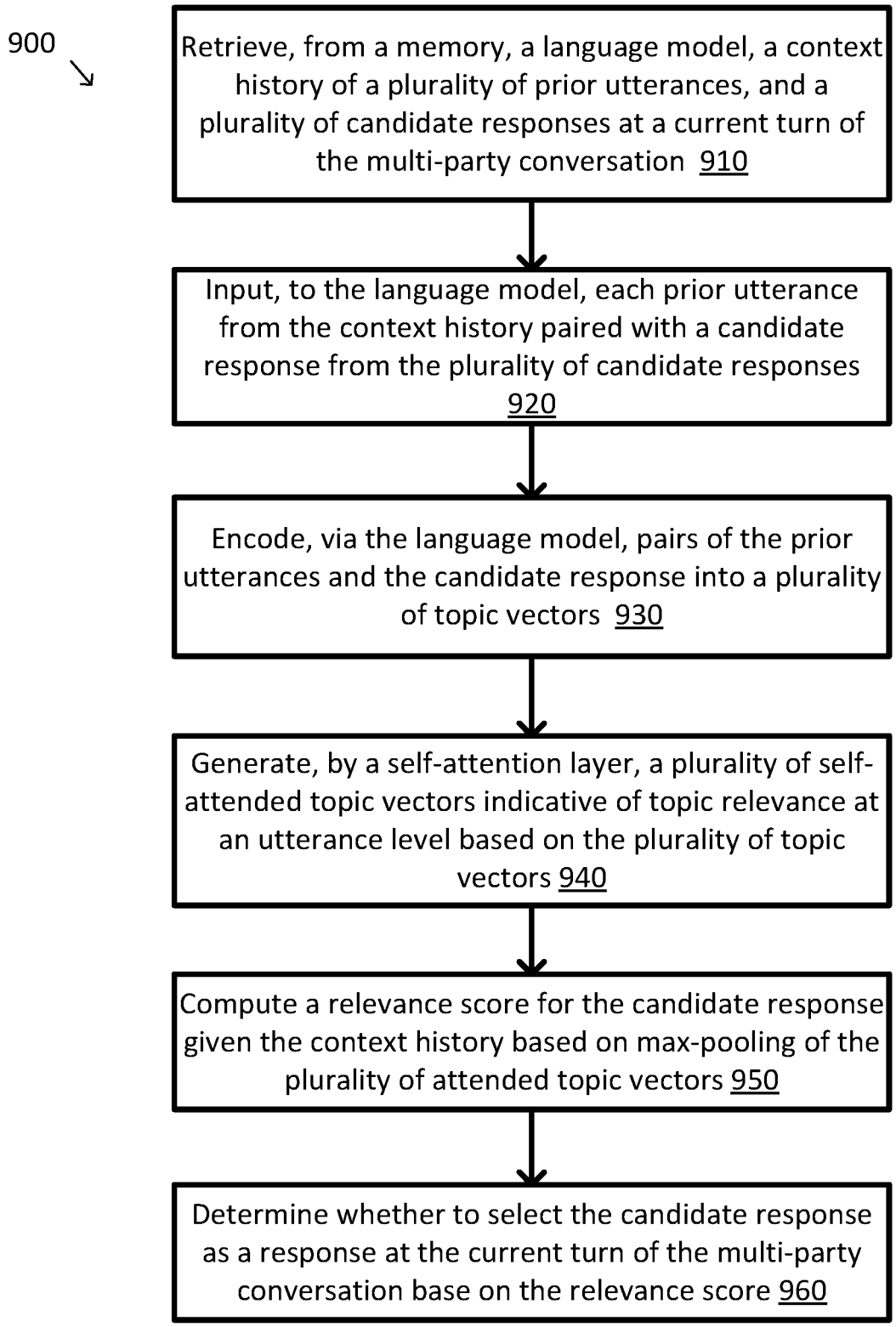
FIG. 9 is a simplified logic flow diagram illustrating a method for selecting a response for an utterance in a multi-party dialogue using the language model pretrained in FIG. 8, according to some embodiments.

FIG. 9 is a simplified logic flow diagram illustrating a method for selecting a response for an utterance in a multi-party dialogue using the language model pretrained in FIG. 8, according to some embodiments. One or more of the processes 910-980 of method 900 may be implemented, at least in part, in the form of executable code stored on non-transitory, tangible, machine-readable media that when run by one or more processors may cause the one or more processors to perform one or more of the processes 910-980.

In some embodiments, method 900 may correspond to the method used by the module 330 in FIG. 3.

At process 910, the multi-party dialogue module may retrieve, from a memory, a language model, a context history of a plurality of prior utterances, and a plurality of candidate responses at a current turn of the multi-party conversation. For example, the memory 330 may store the topic-BERT model 231, the context history, and candidate response data.

At process 920, each prior utterance from the context history is input to the language model paired with a candidate response from the plurality of candidate responses. For example, utterance and candidate response pairs 501a-n shown in FIG. 5 may be input to the pretrained topic-BERT 231b in the form of a flattened input sequence 505, as shown in FIG. 5.

At process 930, the language model may encode pairs of the prior utterances and the candidate response into a plurality of topic vectors. For example, a transformer layer in the language model may encode the input sequence of tokens 505 into an encoded representation 512 including a first portion 512b representing a start token in the input sequence of tokens and a second portion 512a representing remaining tokens in the input sequence of tokens, as shown in FIG. 5. The attended second portion 235 of the encoded representation and the first portion 512b are concatenated to result in a topic vector from the plurality of topic vectors 214a-n. For example, the encoded representation 512a may be attended over by the topic attention layer 530 to result in the topic vector 235, which is concatenated with the encoded [CLS] representation 512b to form the topic vectors 214a-n.

At process 940, a plurality of self-attended topic vectors indicative of topic relevance at an utterance level are generated based on the plurality of topic vectors. For example, the self-attended vectors 216a-n may be generated by the self-attention layer 260, allowing the topic vectors 214a-n to attend to each other.

At process 950, a relevance score for the candidate response is computed given the context history is computed based on max-pooling of the plurality of attended topic vectors. For example, a max-pooling layer 470 is applied to the plurality of attended topic vectors 216a-n, followed by a softmax operation 472 over a linear mapping 471 of the max-pooling output to obtain the relevance score 217. The relevance score 217 $f_{\theta_r}(c_i, r_{i,j})$ indicating that the candidate response $r_{i,j}$ is a relevant response to the context $c_i$ with model parameters $\theta_r$. The relevance score 217 is then used by the response selection loss module 242 to compute a response selection loss $\mathcal{L}_r$.

At process 960, the response selection module may determine whether to select the candidate response as a response at the current turn of the multi-party conversation base on the relevance score. For example, the response selection module may select a candidate response having the highest relevance score with a particular utterance.

Example Performance

FIG. 10 shows an example data table illustrating dataset statistics for multi-party conversations, according to one embodiment. The publicly available Ubuntu dataset from DSTC-8 track 2 "NOESIS II: Predicting Responses" (described in Kim et al., The eighth dialog system technology challenge. arXiv preprint arXiv:1911.06394, 2019). This dataset consists of four tasks and the datasets from three of them are used, including Task 1: single-topic multi-party dialogues for response se-lection; Task 2: a long Ubuntu chat log with multi-party conversations of multiple on-going topics simultaneously; Task 4: multi-party chat with link annotations (used for disentanglement task). Table 1 shows the dataset statistics.

FIG. 11 shows an example data table illustrating the performance comparison between the topic-BERT model with various base models using the dataset shown in FIG. 10, according to one embodiment. The topic-BERT approach is compared with several existing approaches for response selection, including the uncased BERT model, BERT-ESIM model, and the adapt-BERT model. The caption "–TP" means topic-BERT model excluding topic prediction loss and "–D" means excluding topic disentanglement loss.

Specifically, the uncased BERT model is used as the base model, and the BERT base is post-trained for 10 epochs on DSTC-Task 1 (response selection in a single-topic dialog). The whole context is taken with the response as one input sequence, and then finetuned on Task 2's response selection for 10 more epochs. The BERT-ESIM model ensembles both ESIM (from Chen et al., Enhanced LSTM for natural language inference. In Proceedings of the 55th Annual Meeting of the Association for Computational Linguistics, Volume 1: Long Papers, pages 1657-1668, 2017) and BERT with gradient boosting classifier, and ranks the second best in DSTC-8 response selection. The Adapt-BERT model (see Wu et al., 2020) is based on BERT model with task-related pretraining and context modeling through hard and soft context modeling.

As shown in FIG. 11, the topic-BERT model outperforms the baselines by a large margin. By examining topic-BERT model in detail, the context filtering, self-supervised topic training and topic attention contribute positively to topic-BERT model, boosting the metric of Re-call@1 from 0.287 (BERTbase) to 0.696 (Topic-BERT with standalone response selection task). This shows that the topic pretraining with task related data improves BERT for response selection task.

Furthermore, the performance continues to increase from 0.696 to 0.710, when response selection and topic prediction are jointly trained (2nd last row), validating an effective utilization of topic information in selecting response. Then topic prediction is replaced with disentanglement, which further improves from 0.710 to 0.720, showing response selection can utilize topic tracing by sharing the connection of utterances. Finally, the Topic-BERT with the multi-task learning achieves the best result (0.726) and significantly outperform the Adapt-BERT in DSTC-8 response selection task.

FIG. 12 shows an example data table illustrating the BLEU4 and N-gram precision value of the topic-BERT, according to one embodiment described herein. The BLEU4 SacreBLEU for the incorrectly selected responses by topic-BERT is then computed. Responses retrieved by topic-BERT are generally relevant even if they are not the top one.

FIG. 13 shows an example data table illustrating the topic prediction results on the dataset shown in FIG. 10, according to one embodiment described herein. The caption "w/o FT" means topic-BERT without fine-tuning, "–RS" means the topic-BERT model excluding the response selection loss, "–D" means excluding disentanglement loss. The post-trained BERTbase fine-tuned on Task 1 topic sentence pairs as a BERT baseline for topic prediction. FIG. 13 shows that topic-BERT outperforms the baselines BERT significantly in the topic pre-diction task. Compared with the pretrained Topic-BERT without fine-tuning (last row), the proposed topic attention further enhances the topic matching of two utterances by improving the F-score by 1.5% (from 0.813 to 0.828). Joint training with response selection or disentanglement tasks show similar effect on topic prediction tasks, and the con-textual topic information sharing by Topic-BERT multi-task model add a marginal improvement in topic prediction.

FIG. 14 shows an example data table illustrating topic entanglement results on the dataset shown in FIG. 10, according to one embodiment described herein. The caption "–RS" means topic-BERT model excluding response selection loss, and "–TP" means excluding topic prediction loss. A fine-tuned BERT described in relation to FIG. 13 may be used as the baseline by taking the history of utterances $(u_1, \ldots, u_{n-1}, u_n)$ and pair each with the current utterance $u_n$ itself from a dialogue as input. A single-layer BiLSTM is applied to extract the cross message semantics of [CLS] outputs. Then the differences and element-wise products are taken between the history and current utterance. Finally, a feedforward layer is used for link prediction.

The feed-forward model is the baseline model3 from DSTC-8 task organizers described in Kummerfeld et al., DSTC7 task 1: Noetic end-to-end response selection, in Proceedings of the First Workshop on NLP for Conversational AI, pages 60-67, Florence, Italy. Association for Computational Linguistics, 2019, which is trained by employing a two-layer feed-forward neural network on a set of 77 hand engineered features combined with word average embed-dings from pretrained Glove embeddings.

The Masked Hierarchical (MH) BERT is a two-stage BERT proposed by Zhu et al., Who did they respond to? conversation structure modeling using masked hierarchical transformer, arXiv preprint arXiv:1911.10666., 2019, to model the conversation structure, in which the low-level BERT is to capture the utterance-level contextual representation between utterances, and the high-level BERT is to model the conversation structure with an ancestor masking approach to avoid irrelevant connections.

As shown in FIG. 14, topic-BERT achieves the best result and outperforms all the BERT based baselines significantly. This shows the multi-task learning can enrich the link relationship for improving disentanglement together with topic prediction and response selection. The improvement of topic-BERT over the baseline model using feed-forward network and hand-crafted features is relatively less, but topic-BERT is able to avoid manual feature engineering.

FIG. 15 shows an example data table illustrating the response selection results on a dataset different from the dataset shown in FIG. 10, according to one embodiment described herein. Specifically, FIG. 15 examines topic-BERT's transferability on a new task based on another Ubuntu Corpus v1 dataset by comparing with various response selection methods. The Ubuntu Corpus V1 contains 1M train set, 500 K validation and 500 K test set.

The BERT-DPT model (see Whang et al., Domain adaptive training BERT for response selection. arXiv preprint arXiv:1908.04812, 2019) is used as a baseline model, which fine-tunes BERT by optimizing the domain post-training (DPT) loss comprising both NSP and MLM objectives for response selection. Additional baseline models include DL2R, which is a deep neural network to capture the relations cross sentence pairs. Query will be reformulated along with context utterance to enrich the contextual information for response selection (see Yan et al., Learning to Respond with Deep Neural Networks for Retrieval-Based Human-Computer Conversation System, Proceedings of the 39th International ACM SIGIR Conference on Research and Development in Information Retrieval, pp. 55-64, 2016). Multi View is a combination of word sequence model and utterance sequence model, the word-view and utterance-view will be used through a hierarchical RNN for response matching (see Zhou et al., Multi-view Response Selection for Human-Computer Conversation, Proceedings of the 2016 Conference on Empirical Methods in Natural Language Processing, 2016). SMN provides a network where response will be matched with each contextual utterances at multiple levels of granularity, then SMN will accumulate these matching information to select response (see Yu et al., A Sequential Matching Framework for Multi-Turn Response Selection in Retrieval-Based Chatbots, Computational Linguistics, vol. 45, no. 1, pp. 163-197, 2019). AK-DE-biGRU is attention based dual encoder with external data to incorporate domain knowledge to improve response selection (see Chaudhuri et al., Improving response selection in multi-turn dialogue systems by incorporating domain knowledge, arXiv preprint arXiv:1809.03194, 2018). DUA proposed utterance aggregation approach with attention matching for response selection (see Zhang et al., Modeling multi-turn conversation with deep utterance aggregation, arXiv preprint arXiv:1806.09102, 2018). DAM is a transformer based model to utilize utterances self-attention and context-to-response cross attention to leverage the hidden representation at multi-grained level (See Zhou et al., Multi-Turn Response Selection for Chatbots with Deep Attention Matching Network, Proceedings of the 56th Annual Meeting of the Association for Computational Linguistics (Volume 1: Long Papers), pp. 1118-1127, 2018). IMN and ESIM both enrich sentence representation with inter-sentence matching to solve response selection problem (see Gu et al., Interactive matching network for multi-turn response selection in retrieval-based chatbots, Proceedings of the 28th ACM International Conference on Information and Knowledge Management, pp. 2321-2324, 2019; Chen et al., Enhanced LSTM for Natural Language Inference, Proceedings of the 55th Annual Meeting of the Association for Computational Linguistics (Volume 1: Long Papers), pp. 1657-1668, 2017).

As shown in FIG. 15, topic-BERT with standalone response selection task finetuned on Ubuntu Corpus v1 outperforms the BERT-DPT, improved by about 1% for Recall10@1. This result shows that the learned topic relevance in Topic-BERT can be potentially transferable to a novel task, the topic information influences the response selection positively, and the utterance-level topic tracking is effective for response selection.

Some examples of computing devices, such as computing device 200 may include non-transitory, tangible, machine readable media that include executable code that when run by one or more processors (e.g., processor 210) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

This application is further described with respect to the attached document in Appendix I., entitled "Response Selection in Multi-Party Conversations with Dynamic Topic Tracking," 10 pages, which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for dynamic topic tracking in a multi-party conversation involving interactions between at least two user participants and the system on different topics, the system comprising:
   a memory configured to store a language model, a context history of a plurality of prior utterances from multiple user participants relating to multiple topics, and a plurality of candidate responses at a current turn of the multi-party conversation;
   a processor configured to:
   input, to the language model, each prior utterance from the context history paired with a candidate response from the plurality of candidate responses;
   encode, via the language model, pairs of the prior utterances and the candidate response into a plurality of topic vectors;
   generate, by a self-attention layer, a plurality of self-attended topic vectors indicative of topic relevance at an utterance level by inputting and letting the plurality of topic vectors attend to each other at the utterance level;
   compute a relevance score for the candidate response given the context history based on max-pooling of the plurality of attended topic vectors; and
   determine whether to select the candidate response as a response at the current turn of the multi-party conversation base on the relevance score.

2. The system of claim 1, wherein the processor is further configured to encode, via the language model, pairs of the prior utterances and the candidate response into the plurality of topic vectors by:
   generating an input sequence of tokens representing a pair of an utterance and a candidate response;
   encoding, via a transformer layer in the language model, the input sequence of tokens into an encoded representation including a first portion representing a start token in the input sequence of tokens and a second portion representing remaining tokens in the input sequence of tokens;
   attending over the second portion of the encoded representation based on the first portion as query; and
   concatenating the attended second portion of the encoded representation and the first portion to result in a topic vector from the plurality of topic vectors.

3. The system of claim 1, wherein the processor is further configured to compute the relevance score for the candidate response given the context history based on max-pooling of the plurality of attended topic vectors by:
   generating a max-pooling output from the plurality of attended topic vectors;
   performing a softmax operation over a linear mapping of the max-pooling output to obtain the relevance score, wherein the relevance score indicates a relevance level between the respective prior utterance and the candidate response; and
   computing a first entropy loss based on the relevance score and a ground truth label.

4. The system of claim 3, wherein the processor is further configured to:
   compute a binary topic classifier based on the plurality of topic vectors, wherein the binary topic classifier indicates whether the respective prior utterance and the candidate response belongs to a same topic; and
   compute a second cross entropy loss based on the binary topic classifier.

5. The system of claim 4, where the processor is further configured to:
   compute a reply-to distribution based on the plurality of attended topic vectors, wherein the reply-to distribution indicates a probability that the candidate response replies to the respective prior utterance; and
   compute a third cross-entropy loss based on the reply-to distribution.

6. The system of claim 5, wherein the processor is further configured to:
   compute a combined loss as a weighted sum of the first cross-entropy loss, the second cross-entropy loss and the third cross-entropy loss; and
   jointly update a response selection module, a topic prediction module and a topic entanglement module based on the combined loss.

7. The system of claim 1, wherein the language model is pre-trained with a pretraining dataset including a plurality of utterances, each utterance being paired with a respective positive response from the multi-party conversation and a respective negative response from outside the multi-party conversation.

8. The system of claim 7, wherein the processor is further configured to:
   input a first utterance and a second utterance, from the pretraining dataset, in a form of a training sequence to the language model, wherein the training sequence includes a first token that predicts whether the first utterance and the second utterance belong to a same topic;
   generate, by embedding, a token representation of the training sequence;

generate, by an encoder layer of the language model, encoded topic vectors of the token representation, wherein the encoded topic vector includes a first encoded topic vector corresponding to the first token and wherein the first encoded topic vector encodes a topic relationship between the first utterance and the second utterance;

determine whether the first utterance and the second utterance are matched in topic using the encoded first token as a contextual embedding; and update the language model using a determined topic relationship between the first utterance and the second utterance.

9. The system of claim 8, wherein the processor is further configured to:

mask at least a portion of the pretraining dataset comprising the plurality of utterances, paired positive responses and paired negative responses; and train the language model using the masked pretraining dataset based on a masked language modeling loss.

10. The system of claim 8, wherein the token representation includes a first representation corresponding to a start token in the training sequence, and the processor is further configured to:

encode, via a transformer layer in the language model, a topic relationship between the first utterance and the second utterance into the first representation.

11. A method for dynamic topic tracking in a multi-party conversation involving interactions between at least two user participants and the system on different topics, the method comprising:

retrieving, from a memory, a language model, a context history of a plurality of prior utterances from multiple user participants relating to multiple topics, and a plurality of candidate responses at a current turn of the multi-party conversation;

inputting, to the language model, each prior utterance from the context history paired with a candidate response from the plurality of candidate responses;

encoding, via the language model, pairs of the prior utterances and the candidate response into a plurality of topic vectors;

generating, by a self-attention layer, a plurality of self-attended topic vectors indicative of topic relevance at an utterance level by inputting and letting the plurality of topic vectors attend to each other at the utterance level;

computing a relevance score for the candidate response given the context history based on max-pooling of the plurality of attended topic vectors; and determining whether to select the candidate response as a response at the current turn of the multi-party conversation base on the relevance score.

12. The method of claim 11, wherein the encoding, via the language model, pairs of the prior utterances and the candidate response into the plurality of topic vectors comprises:

generating an input sequence of tokens representing a pair of an utterance and a candidate response;

encoding, via a transformer layer in the language model, the input sequence of tokens into an encoded representation including a first portion representing a start token in the input sequence of tokens and a second portion representing remaining tokens in the input sequence of tokens;

attending over the second portion of the encoded representation based on the first portion as query; and concatenating the attended second portion of the encoded representation and the first portion to result in a topic vector from the plurality of topic vectors.

13. The method of claim 11, wherein the computing the relevance score for the candidate response given the context history based on max-pooling of the plurality of attended topic vectors comprises:

generating a max-pooling output from the plurality of attended topic vectors;

performing a softmax operation over a linear mapping of the max-pooling output to obtain the relevance score, wherein the relevance score indicates a relevance level between the respective prior utterance and the candidate response; and computing a first entropy loss based on the relevance score and a ground truth label.

14. The method of claim 13, further comprising:

computing a binary topic classifier based on the plurality of topic vectors, wherein the binary topic classifier indicates whether the respective prior utterance and the candidate response belongs to a same topic; and computing a second cross entropy loss based on the binary topic classifier.

15. The method of claim 14, further comprising:

computing a reply-to distribution based on the plurality of attended topic vectors, wherein the reply-to distribution indicates a probability that the candidate response replies to the respective prior utterance; and computing a third cross-entropy loss based on the reply-to distribution.

16. The method of claim 15, further comprising:

computing a combined loss as a weighted sum of the first cross-entropy loss, the second cross-entropy loss and the third cross-entropy loss; and jointly updating a response selection module, a topic prediction module and a topic entanglement module based on the combined loss.

17. The method of claim 11, wherein the language model is pre-trained with a pretraining dataset including a plurality of utterances, each utterance being paired with a respective positive response from the multi-party conversation and a respective negative response from outside the multi-party conversation.

18. The method of claim 17, further comprising:

inputting a first utterance and a second utterance, from the pretraining dataset, in a form of a training sequence to the language model, wherein the training sequence includes a first token that predicts whether the first utterance and the second utterance belong to a same topic;

generating, by embedding, a token representation of the training sequence;

generating, by an encoder layer of the language model, encoded topic vectors of the token representation, wherein the encoded topic vector includes a first encoded topic vector corresponding to the first token and wherein the first encoded topic vector encodes a topic relationship between the first utterance and the second utterance;

determining whether the first utterance and the second utterance are matched in topic using the encoded first token as a contextual embedding; and updating the language model using a determined topic relationship between the first utterance and the second utterance.

19. The method of claim 18, wherein the token representation includes a first representation corresponding to a start token in the training sequence, and the method further comprises:

encoding, via a transformer layer in the language model, a topic relationship between the first utterance and the second utterance into the first representation.

20. A processor-readable non-transitory storage medium storing processor-executable instructions for dynamic topic tracking in a multi-party conversation involving interactions between at least two user participants and the system on different topics, the processor-executable instructions being executed by a processor to perform operations including:

retrieving a language model, a context history of a plurality of prior utterances from multiple user participants relating to multiple topics, and a plurality of candidate responses at a current turn of the multi-party conversation;

inputting, to the language model, each prior utterance from the context history paired with a candidate response from the plurality of candidate responses;

encoding, via the language model, pairs of the prior utterances and the candidate response into a plurality of topic vectors;

generating, by a self-attention layer, a plurality of self-attended topic vectors indicative of topic relevance at an utterance level by inputting and letting the plurality of topic vectors attend to each other at the utterance level;

computing a relevance score for the candidate response given the context history based on max-pooling of the plurality of attended topic vectors; and determining whether to select the candidate response as a response at the current turn of the multi-party conversation base on the relevance score.

* * * * *